United States Patent
Guo et al.

(10) Patent No.: US 11,907,483 B2
(45) Date of Patent: Feb. 20, 2024

(54) WEARING DETECTION APPARATUS AND METHOD, AND EARPHONE

(71) Applicant: SHENZHEN GOODIX TECHNOLOGY CO., LTD., Guangdong (CN)

(72) Inventors: Zhuangju Guo, Guangdong (CN); Yawen Chen, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 331 days.

(21) Appl. No.: 17/372,632

(22) Filed: Jul. 12, 2021

(65) Prior Publication Data

US 2021/0342032 A1    Nov. 4, 2021

Related U.S. Application Data

(63) Continuation of application No. PCT/CN2019/074432, filed on Feb. 1, 2019.

(51) Int. Cl.
*G06F 3/044* (2006.01)
*H04R 1/10* (2006.01)

(52) U.S. Cl.
CPC ......... *G06F 3/0443* (2019.05); *H04R 1/1041* (2013.01); *G06F 3/0447* (2019.05)

(58) Field of Classification Search
CPC .... G06F 3/0443; G06F 3/0447; H04R 1/1041
See application file for complete search history.

(56) References Cited

U.S. PATENT DOCUMENTS

| | | | |
|---|---|---|---|
| 9,094,764 B2* | 7/2015 | Rosener | H04R 19/00 |
| 9,998,817 B1* | 6/2018 | Liu | H04R 1/1041 |
| 2009/0003641 A1 | 1/2009 | van der Bilt | |
| 2017/0094411 A1 | 3/2017 | Peterson et al. | |

(Continued)

FOREIGN PATENT DOCUMENTS

| | | |
|---|---|---|
| CN | 101087135 A | 12/2007 |
| CN | 103002373 A | 3/2013 |

(Continued)

OTHER PUBLICATIONS

Translation of CN107065016A, Aug. 18, 2017, Zheng (Year: 2017).*

(Continued)

*Primary Examiner* — Andrew L Sniezek
(74) *Attorney, Agent, or Firm* — Scully, Scott, Murphy & Presser, P.C.

(57) ABSTRACT

A wearing detection apparatus and method, and an earphone are provided. The wearing detection apparatus is configured to be mounted on an earphone and includes: at least one first capacitive sensor and at least one second capacitive sensor, where the first capacitive sensor is disposed at an inner side of the second capacitive sensor; and a detection module configured to detect a first coupling capacitance between a touch object touching the earphone and the first capacitive sensor and a second coupling capacitance between the touch object and the second capacitive sensor when the earphone is touched, and to determine whether the earphone is worn by a human ear according to a difference between the first coupling capacitance and the second coupling capacitance.

14 Claims, 3 Drawing Sheets

(56) References Cited

U.S. PATENT DOCUMENTS

| | | |
|---|---|---|
| 2018/0288515 A1 | 10/2018 | Peterson et al. |
| 2019/0052965 A1 | 2/2019 | Peterson et al. |
| 2019/0215611 A1* | 7/2019 | Lou ..................... H04R 1/1041 |
| 2019/0297408 A1* | 9/2019 | Mohammadi ........ H04R 1/1016 |

FOREIGN PATENT DOCUMENTS

| | | | | |
|---|---|---|---|---|
| CN | 103838446 A | | 6/2014 | |
| CN | 106792314 A | * | 5/2017 | ........... H04R 1/1008 |
| CN | 106792314 A | | 5/2017 | |
| CN | 107065016 A | * | 8/2017 | ............... G01V 3/00 |
| CN | 107065016 A | | 8/2017 | |
| CN | 107949824 A | | 4/2018 | |
| CN | 108702567 A | | 10/2018 | |
| WO | 2016089614 A1 | | 6/2016 | |

OTHER PUBLICATIONS

Translation of CN106792314a, May 31, 2017, Fu (Year: 2017).*
International Search Report dated Jul. 1, 2019 issued in PCT/CN2019/074432.

* cited by examiner

300

| detecting a first coupling capacitance between a touch object and the first capacitive sensor and a second coupling capacitance between the touch object and the second capacitive sensor when an earphone mounted with the wearing detection apparatus is touched by the touch object | S301 |

| determining whether the earphone is worn by a human ear according to a difference between the first coupling capacitance and the second coupling capacitance | S302 |

FIG. 7

WEARING DETECTION APPARATUS AND METHOD, AND EARPHONE

CROSS-REFERENCE TO RELATED APPLICATIONS

This application is a continuation of International Application No. PCT/CN2019/074432, filed on Feb. 1, 2019, the disclosure of which is hereby incorporated by reference in its entirety.

TECHNICAL FIELD

The present application relates to the field of capacitance detection technologies, and in particular, to a wearing detection apparatus and method, and an earphone.

BACKGROUND

Smart wearable devices such as headsets bring people a rich user experience. A wearing detection apparatus may be disposed in a headset to detect whether the headset is worn by a human ear. Specifically, a capacitive sensor is disposed in the headset, and when the headset is close to the ear, whether the headset is worn well is determined according to a change in capacitance of the capacitive sensor.

However, when a touch object such as a finger, a palm or an arm touches the capacitive sensor, it is usually falsely determined that the headset is worn by the human ear, thereby turning on a functional module inside the headset, such as a music play function, which affects user experiences.

SUMMARY

Embodiments of the present application provide a wearing detection apparatus and method, and an earphone, which could improve accuracy of earphone wearing detection, thereby improving user experiences.

In a first aspect, a wearing detection apparatus is provided, and the wearing detection apparatus is configured to be mounted on an earphone and includes:
  at least one first capacitive sensor and at least one second capacitive sensor, where the first capacitive sensor is disposed at an inner side of the second capacitive sensor; and
  a detection module configured to detect a first coupling capacitance between a touch object touching the earphone and the first capacitive sensor and a second coupling capacitance between the touch object and the second capacitive sensor when the earphone is touched, and to determine whether the earphone is worn by a human ear according to a difference between the first coupling capacitance and the second coupling capacitance.

In some possible implementation manners, the detection module is specifically configured to:
  determine whether the earphone is worn by the human ear according to a difference value between the first coupling capacitance and the second coupling capacitance.

In some possible implementation manners, the detection module is specifically configured to:
  if the difference value between the first coupling capacitance and the second coupling capacitance is greater than a first threshold, determine that the earphone is worn by the human ear; or
  if the difference value between the first coupling capacitance and the second coupling capacitance is less than or equal to a first threshold, determine that the earphone is not worn by the human ear.

In some possible implementation manners, the detection module is specifically configured to:
  determine whether the earphone is worn by the human ear according to the difference value between the first coupling capacitance and the second coupling capacitance as well as the first coupling capacitance.

In some possible implementation manners, the detection module is specifically configured to:
  if the difference value between the first coupling capacitance and the second coupling capacitance is greater than a first threshold and the first coupling capacitance is greater than a second threshold, determine that the earphone is worn by the human ear; or
  if the difference value between the first coupling capacitance and the second coupling capacitance is less than or equal to a first threshold, determine that the earphone is not worn by the human ear.

In some possible implementation manners, capacitance parameters of the first capacitive sensor and the second capacitive sensor are the same.

In some possible implementation manners, the detection module is further configured to:
  if capacitance parameters of the first capacitive sensor and the second capacitive sensor are different, process the first coupling capacitance and the second coupling capacitance according to the capacitance parameters of the first capacitive sensor and the second capacitive sensor, to obtain an equivalent first coupling capacitance and an equivalent second coupling capacitance under a same capacitance parameter, and determine whether the earphone is worn by the human ear according to a difference between the equivalent first coupling capacitance and the equivalent second coupling capacitance.

In some possible implementation manners, when the earphone is worn by the human ear, an electrode plane of the first capacitive sensor is parallel to a plane of the human ear, and an electrode plane of the second capacitive sensor is parallel to the plane of the human ear or perpendicular to the plane of the human ear.

In some possible implementation manners, a third capacitive sensor is disposed under an electrode of the first capacitive sensor, and a fourth capacitive sensor is disposed under an electrode of the second capacitive sensor,
  where capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

In some possible implementation manners, at least one fifth capacitive sensor is disposed between the first capacitive sensor and the second capacitive sensor, and the detection module is further configured to:
  detect at least one third coupling capacitance between the touch object and the at least one fifth capacitive sensor when the touch object touches the earphone, and determine a wearing state of the earphone according to a difference value between coupling capacitances corresponding to two adjacent capacitive sensors among the first coupling capacitance, the at least one third coupling capacitance and the second coupling capacitance.

In some possible implementation manners, the second capacitive sensor is disposed in an edge area of the earphone, and the first capacitive sensor is disposed in an area where the human ear is in contact with the earphone when the earphone is worn by the human ear.

In some possible implementation manners, the first capacitive sensor is connected to a first channel of the detection module, the second capacitive sensor is connected to a second channel of the detection module, and the detection module is specifically configured to:

detect the first coupling capacitance between the touch object and the first capacitive sensor through the first channel, and detect the second coupling capacitance between the touch object and the second capacitive sensor through the second channel.

In some possible implementation manners, the first capacitive sensor and the second capacitive sensor are in a concentric circular ring shape or a concentric rectangular shape.

In some possible implementation manners, the earphone is a headset.

In a second aspect, a method for wearing detection is provided, and applied to a wearing detection apparatus including at least one first capacitive sensor and at least one second capacitive sensor, where the first capacitive sensor is disposed at an inner side of the second capacitive sensor, and the method includes:

detecting a first coupling capacitance between a touch object and the first capacitive sensor and a second coupling capacitance between the touch object and the second capacitive sensor when an earphone mounted with the wearing detection apparatus is touched by the touch object; and determining whether the earphone is worn by a human ear according to a difference between the first coupling capacitance and the second coupling capacitance.

In some possible implementation manners, the determining whether the earphone is worn by the human ear according to the difference between the first coupling capacitance and the second coupling capacitance, includes:

determining whether the earphone is worn by the human ear according to a difference value between the first coupling capacitance and the second coupling capacitance.

In some possible implementation manners, the determining whether the earphone is worn by the human ear according to the difference value between the first coupling capacitance and the second coupling capacitance, includes:

if the difference value between the first coupling capacitance and the second coupling capacitance is greater than a first threshold, determining that the earphone is worn by the human ear; or if the difference value between the first coupling capacitance and the second coupling capacitance is less than or equal to a first threshold, determining that the earphone is not worn by the human ear.

In some possible implementation manners, the determining whether the earphone is worn by the human ear according to the difference value between the first coupling capacitance and the second coupling capacitance, includes:

determining whether the earphone is worn by the human ear according to the difference value between the first coupling capacitance and the second coupling capacitance as well as the first coupling capacitance.

In some possible implementation manners, the determining whether the earphone is worn by the human ear according to the difference value between the first coupling capacitance and the second coupling capacitance as well as the first coupling capacitance, includes:

if the difference value between the first coupling capacitance and the second coupling capacitance is greater than a first threshold and the first coupling capacitance is greater than a second threshold, determining that the earphone is worn by the human ear; or if the difference value between the first coupling capacitance and the second coupling capacitance is less than or equal to a first threshold, determining that the earphone is not worn by the human ear.

In some possible implementation manners, capacitance parameters of the first capacitive sensor and the second capacitive sensor are the same.

In some possible implementation manners, the method further includes:

if capacitance parameters of the first capacitive sensor and the second capacitive sensor are different, processing the first coupling capacitance and the second coupling capacitance according to the capacitance parameters of the first capacitive sensor and the second capacitive sensor, to obtain an equivalent first coupling capacitance and an equivalent second coupling capacitance under a same capacitance parameter, and determining whether the earphone is worn by the human ear according to a difference between the equivalent first coupling capacitance and the equivalent second coupling capacitance.

In some possible implementation manners, at least one fifth capacitive sensor is disposed between the first capacitive sensor and the second capacitive sensor, and the method further includes:

detecting at least one third coupling capacitance between the touch object and the at least one fifth capacitive sensor when the touch object touches the earphone, and determining a wearing state of the earphone according to a difference value between coupling capacitances corresponding to two adjacent capacitive sensors among the first coupling capacitance, the at least one third coupling capacitance and the second coupling capacitance.

In some possible implementation manners, when the earphone is worn by the human ear, an electrode plane of the first capacitive sensor is parallel to a plane of the human ear, and an electrode plane of the second capacitive sensor is parallel to the plane of the human ear or perpendicular to the plane of the human ear.

In some possible implementation manners, a third capacitive sensor is disposed under an electrode of the first capacitive sensor, and a fourth capacitive sensor is disposed under an electrode of the second capacitive sensor, where capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

In some possible implementation manners, the second capacitive sensor is disposed in a touch area when a human hand touches the earphone, and the first capacitive sensor is disposed in an area where the human ear is in contact with the earphone when the earphone is worn by the human ear.

In some possible implementation manners, the second capacitive sensor is disposed in an edge area of the earphone, and the first capacitive sensor is disposed in an area where the human ear is in contact with the earphone when the earphone is worn by the human ear.

In some possible implementation manners, the wearing detection apparatus further includes a plurality of channels, the first capacitive sensor is connected to a first channel of the plurality of channels, the second capacitive sensor is connected to a second channel of the plurality of channels, and the method further includes:

detecting the first coupling capacitance between the touch object and the first capacitive sensor through the first channel, and detecting the second coupling capacitance between the touch object and the second capacitive sensor through the second channel.

In some possible implementation manners, the first capacitive sensor and the second capacitive sensor are in a concentric circular ring shape or a concentric rectangular shape.

In some possible implementation manners, a part or all of first capacitive sensors in the at least one first capacitive sensor constitute a first circular ring, a part or all of second capacitive sensors in the at least one second capacitive sensor constitute a second circular ring, and the first capacitive sensors constituting the first circular ring are arranged at inner sides of the second capacitive sensors constituting the second circular ring.

In some possible implementation manners, a part or all of first capacitive sensors in the at least one first capacitive sensor constitute a first circular arc, a part or all of second capacitive sensors in the at least one second capacitive sensor constitute a second circular arc, and the first capacitive sensors constituting the first circular arc are arranged at inner sides of the second capacitive sensors constituting the second circular arc.

In some possible implementation manners, the earphone is a headset.

In a third aspect, an earphone is provided and includes: the wearing detection apparatus in the foregoing first aspect or any one of possible implementation manners of the first aspect.

In a fourth aspect, a computer storage medium is provided, where program codes are stored in the computer storage medium, and the program codes may be configured to instruct execution of the method in the foregoing second aspect or any one of the possible implementation manners in the second aspect.

In a fifth aspect, a computer program product containing instructions is provided, which cause a computer to execute the method in the foregoing second aspect or any one of the possible implementation manners in the second aspect when run on the computer.

Based on the foregoing technical solutions, by disposing a first capacitive sensor and a second capacitive sensor at different positions of an earphone, a difference in capacitance change caused by deformation of different positions may be obtained, so that earphone wearing detection is performed based on the difference in capacitance change, which could improve accuracy of the earphone wearing detection. Further, subsequent associated operations are performed according to a detection result of the earphone wearing detection, which could reduce a false response rate and improve user experiences.

BRIEF DESCRIPTION OF DRAWINGS

FIG. 7 is a schematic flowchart of a method for wearing detection of an embodiment of the present application.

DESCRIPTION OF EMBODIMENTS

Technical solutions in embodiments of the present application will be described hereinafter with reference to the accompanying drawings in the embodiments of the present application.

The technical solutions of the embodiments of the present application may be applied to various types of wearable devices, such as a headset or another earphone with a larger volume, which is not limited in the embodiments of the present application.

Figure 1:
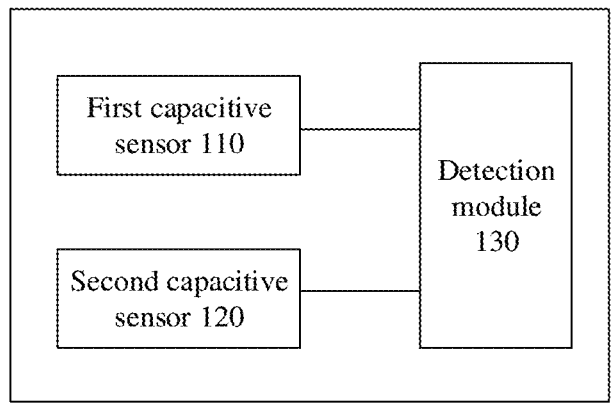
FIG. 1 is a schematic block diagram of a wearing detection apparatus of an embodiment of the present application.

FIG. 1 shows a schematic block diagram of a wearing detection apparatus 10 of an embodiment of the present application. The wearing detection apparatus 10 may be mounted on a wearable device, such as an earphone, and the description will be made hereinafter by an example that the wearable device is an earphone, but should not constitute any limitation to the embodiments of the present application.

As shown in FIG. 1, the wearing detection apparatus 10 includes: at least one first capacitive sensor 110, at least one second capacitive sensor 120 and a detection module 130.

The first capacitive sensor 110 is disposed at an inner side of the second capacitive sensor 120.

In an implementation manner, when the earphone is worn by a human ear, the second capacitive sensor 120 is closer to an edge position of the human ear than the first capacitive sensor 110, such as a position of an auricle or a position of an earlobe, and the first capacitive sensor 110 is closer to a central position of the human ear than the second capacitive sensor 120, such as a position of an auditory meatus.

Figure 2:
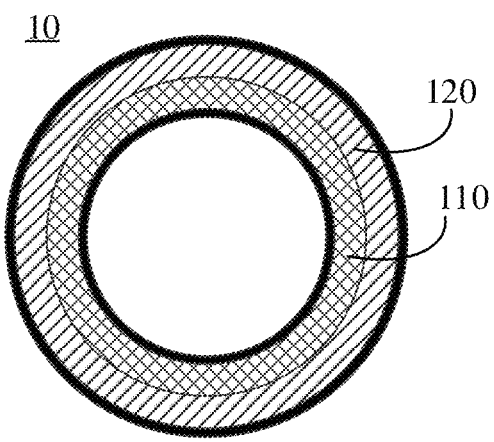
FIG. 2 is a schematic structural diagram of a wearing detection apparatus according to an embodiment of the present application.

For example, as shown in FIG. 2, in the wearing detection apparatus 10, the first capacitive sensor 110 and the second capacitive sensor 120 may be concentric circular rings, where the first capacitive sensor 110 is disposed at an inner ring position, and the second capacitive sensor 120 is disposed at an outer ring position.

In other alternative embodiments, the first capacitive sensor 110 and the second capacitive sensor 120 may also be concentric elliptic, rectangular, or other regular or irregular figures, or may be unclosed figures, which is not limited in the embodiments of the present application, only if the first capacitive sensor is disposed to be close to a central area of the human ear and the second capacitive sensor is disposed to be close to an edge area of the human ear when the earphone is worn.

When a touch object touches the earphone mounted with the wearing detection apparatus 10, the detection module 130 in the wearing detection apparatus 10 may detect a first coupling capacitance between the touch object and the first capacitive sensor 110 and a second coupling capacitance between the touch object and the second capacitive sensor 120. Optionally, the detection module 130 may detect the first coupling capacitance and the second coupling capacitance by means of self-capacitance detection or mutual-capacitance detection.

In a self-capacitance detection solution, the first capacitive sensor 110 and the second capacitive sensor 120 are respectively connected to one of a plurality of channels of the detection module. For example, the detection module 130 may include a plurality of channels, for example, channels Ch1~Ch5, the first capacitive sensor 110 and the second capacitive sensor 120 are respectively connected to one channel of the detection module 130, and this channel is used as a transmitting channel and as a receiving channel. For example, the first capacitive sensor 110 may be connected to a channel Ch1 of the detection module 130, and the second capacitive sensor 120 may be connected to a channel Ch5 of the detection module 130. Further, when the touch object touches the earphone, the detection module 130 may detect coupling capacitances between the touch object and the first capacitive sensor 110 and the second capacitive sensor 120 through the channel Ch1 and the channel Ch5.

In a mutual-capacitance detection solution, the detection module 130 may include a plurality of transmitting channels, for example, channels Tx1~Tx5, and a plurality of receiving channels, for example, Rx1~Rx5, and the first capacitive sensor 110 and the second capacitive sensor 120 are respectively connected to one transmitting channel and one receiving channel of the detection module 130. For example, the first capacitive sensor 110 may be connected to a channel Tx1 and a channel Rx1 of the detection module 130, and the second capacitive sensor 120 may be connected to a channel Tx5 and a channel Rx5 of the detection module 130. Further, the detection module 130 may detect a coupling capacitance between the touch object and the first capacitive sensor 110 through the channel Tx1 and the channel Rx1 and a coupling capacitance between the touch object and the second capacitive sensor 120.

It should be understood that, in the self-capacitance detection solution, a capacitance value of a capacitive sensor increases when a touch object touches the capacitive sensor, while in the mutual-capacitance solution, on the contrary, a capacitance value of a capacitive sensor decreases when a touch object touches the capacitive sensor. The description will be made hereinafter mainly by an example of subsequent comparison of a capacitance difference using coupling capacitances detected by the self-capacitance detection solution. When the mutual-capacitance detection solution is adopted, a capacitance difference only needs to be reversed and then determination is made.

In the embodiment of the present application, by setting a certain position difference between the first capacitive sensor and the second capacitive sensor, that is, one capacitive sensor is located at an inner side of the earphone, and one capacitive sensor is located at an edge of the earphone, in this way, when different touch objects (for example, a human ear or a finger) touch the earphone, there is a significant difference between the first coupling capacitance and the second coupling capacitance, and further, the detection module 130 may determine whether the earphone is worn by the human ear or falsely touched by another touch object based on the difference.

Therefore, the problem of how to prevent a false touch in wearing detection could be solved well based on the solution of the embodiment of the present application. In specific implementation, a triggering rate caused by grasp by a side or back of a finger and grip by a hand could be greatly reduced, while false trigger behavior of hanging the earphone on a neck could be prevented.

In addition, according to the embodiment of the present application, by detecting the capacitance difference between the inner and outer capacitive sensors, and further by distinguishing whether the earphone is falsely touched by the human hand or is normally worn through the capacitance difference, on the one hand, the disadvantage that it is necessary to find a position not easy to be falsely touched in the current sensor design is improved, so that the selection for positions of sensors is easier, which is more beneficial to the manufacture and cost reduction of the wearing detection apparatus provided in the present application; on the other hand, in the embodiment of the present application, the requirements for the positions of the capacitive sensors are relatively low, only if one capacitive sensor is located at the inner side of the earphone and one capacitive sensor is located at an outer side of the earphone, and the structure is simple, which is beneficial to reduction of the costs of the earphone.

It should be understood that, in the embodiment of the present application, the wearing detection apparatus may further include more capacitive sensors, for example, three or four, the embodiment of the present application is introduced by an example of only two capacitive sensors, but the embodiment of the present application is not limited thereto.

Figure 3:
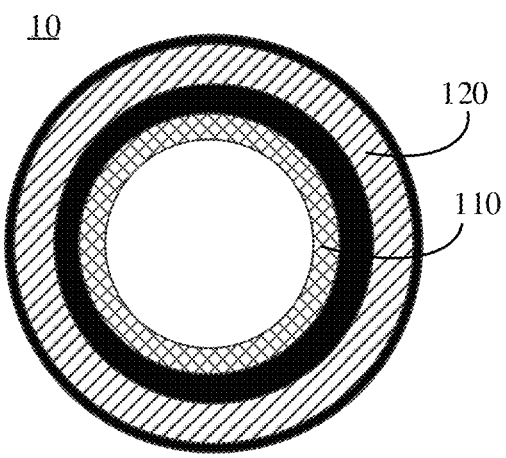
FIG. 3 is a schematic structural diagram of a wearing detection apparatus according to another embodiment of the present application.

Optionally, in the embodiment of the present application, the first capacitive sensor and the second capacitive sensor may be disposed adjacent to each other, that is, the first capacitive sensor may be proximate to the second capacitive sensor, or the first capacitive sensor may be at a certain distance from the second capacitive sensor, as shown in FIG. 3.

As an optional embodiment, when the earphone is worn by the human ear, an electrode plane of the first capacitive sensor is parallel to a plane of the human ear, and an electrode plane of the second capacitive sensor is parallel to the plane of the human ear or perpendicular to the plane of the human ear.

It should be understood that, in the embodiment of the present application, that the electrode plane of the first capacitive sensor is parallel to the plane of the human ear may include that the electrode plane of the first capacitive sensor is parallel or approximately parallel to the plane of the human ear. Similarly, that the electrode plane of the second capacitive sensor is parallel to the plane of the human ear may include that the electrode plane of the second capacitive sensor is parallel or approximately parallel to the plane of the human ear, and that the electrode plane of the second capacitive sensor is perpendicular to the plane of the human ear may include that the electrode plane of the second capacitive sensor is perpendicular or approximately perpendicular to the plane of the human ear.

It should be understood that, in the embodiment of the present application, the electrode plane of the first capacitive sensor may be a plane, or a curved face, or a plane similar to the plane of the human ear, and the parallel or perpendicular relationship between the capacitive sensor and the plane of the human ear according to the embodiment of the present application could be understood as an approximately parallel or approximately perpendicular relationship, which is not an absolute limitation.

It should be understood that FIG. 2 and FIG. 3 are shown only by an example that the electrode plane of the first capacitive sensor and the electrode plane of the second capacitive sensor are both parallel to the plane of the human ear, but the embodiment of the present application is not limited thereto.

Optionally, in some embodiments, capacitance parameters of the second capacitive sensor and the first capacitive sensor may be set to be the same, for example, dielectric constants are the same or electrode areas are the same, so as to perform earphone wearing detection according to a difference value between the first coupling capacitance and the second coupling capacitance.

Figure 4:
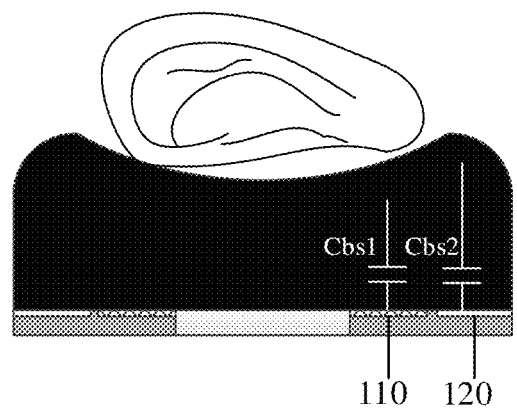
FIG. 4 is a schematic diagram of deformation of an earphone when the earphone is normally worn by a human ear according to an embodiment of the present application.
Figure 5:
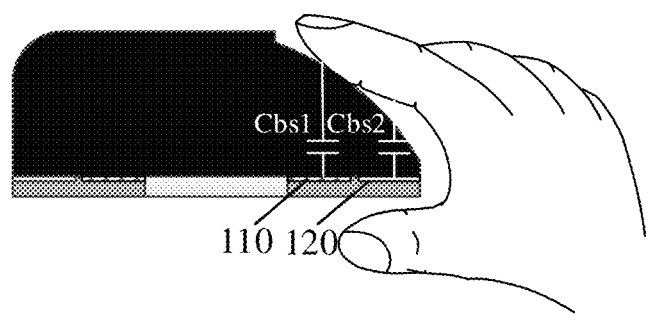
FIG. 5 is a schematic diagram of deformation of an earphone when a human hand touches the earphone according to an embodiment of the present application.

The specific implementation principle for determining whether an earphone is worn by a human ear (or whether an earphone is falsely touched) will be explained hereinafter with reference to FIG. 4 and FIG. 5. FIG. 4 and FIG. 5 are schematic diagrams of deformation of an earphone when the earphone is worn by a human ear and when a human hand touches the earphone, respectively.

With reference to FIG. 4 and FIG. 5, it can be seen that, when the earphone is worn by the human ear and touched by the human hand, deformation positions of the earphone are different. When the earphone is worn by the human ear, the human ear presses the earphone, and an inside of the earphone is sunken, that is, the deformation of the inside of the earphone is greater than the deformation of an outside of the earphone. In other words, the deformation of an area close to the first capacitive sensor 110 is greater than the deformation of an area close to the second capacitive sensor 120. When the earphone is touched by the human hand, the edge of the earphone is sunken, that is, the deformation of the outside of the earphone is greater than the deformation of the inside of the earphone. In other words, the deformation of the area close to the second capacitive sensor 120 is greater than the deformation of the area close to the first capacitive sensor 110.

Accordingly, whether the earphone is worn by the human ear or falsely touched by another touch object such as the human hand may be determined based on a capacitance difference due to the difference between the pressing positions where the earphone is worn by the human ear and touched by the other touch object.

Since the factors that affect a capacitance value of a capacitive sensor mainly are a dielectric constant $\varepsilon$, an electrode area S and a dielectric layer thickness d, when the capacitive sensor deforms by force, it could be considered that the dielectric layer thickness of the capacitive sensor changes. Since the capacitance value is inversely proportional to the dielectric layer thickness, the deformation is severer, or the depression is severer, and a variation of the corresponding capacitive value is greater. On the contrary, the variation of the capacitive value is less.

For ease of description and comparison, the description will be made by an example that capacitance parameters of the first capacitive sensor 110 and the second capacitive sensor 120 are the same.

It should be understood that the same capacitance parameters here may include that electrode areas, dielectric constants or the like of the second capacitive sensor and the first capacitive sensor are the same. In other words, when the touch object does not touch the first capacitive sensor and the second capacitive sensor, initial capacitances (or basic capacitances) of the first capacitive sensor and the second capacitive sensor are the same.

Optionally, in an embodiment of the present application, the detection module may determine whether the earphone is worn by the human ear or falsely touched according to a difference value between the first coupling capacitance and the second coupling capacitance.

It can be seen from the foregoing description that, when the earphone is worn by the human ear, the deformation of the inside of the earphone is greater than the deformation of the outside of the earphone. In this case, the first coupling capacitance detected by the detection module is greater than the second coupling capacitance. Therefore, as an embodiment, the detection module may determine that the earphone is worn by the human ear when the difference value between the first coupling capacitance between the second coupling capacitance is greater than a first threshold.

As another embodiment, when the touch object such as a human hand touches the earphone, the deformation of the outside of the earphone is greater than the deformation of the inside of the earphone. In this case, the first coupling capacitance detected by the detection module is less than the second coupling capacitance. Therefore, the detection module may determine that the earphone is falsely touched when the difference value between the first coupling capacitance between the second coupling capacitance is less than a first threshold.

For example, as shown in FIG. 4, when the earphone is worn by the human ear, the human ear presses the earphone, the earphone is sunken by force, the first capacitive sensor and the second capacitive sensor respectively sense coupling capacitances Cbs1 and Cbs2, where C=Cbs1−Cbs2. When the human hand grasps the earphone, the pinching action may be modeled as shown in FIG. 5, and in this case, the edge of the earphone is sunken, where C=Cbs1−Cbs2.

If the capacitance parameters of the first capacitive sensor and the second capacitive sensor are the same, when the earphone is worn by the human ear, C is a positive value, and when the earphone is falsely touched by the human hand, C is a negative value. Therefore, whether the earphone is worn by the human ear or falsely touched by the human hand may be determined through the distinction of the magnitude of C.

It should be understood that the foregoing determination process is applicable to determination of a wearing state of an earphone, for example, the wearing process of the earphone, for example, the earphone is worn, after the earphone is worn, and after the earphone is taken off, and the specific implementation is similar, which will not be repeated redundantly herein.

Optionally, in some embodiments, the difference value C and semaphore of Cbs1 may also be combined as a determination criterion. For example, when C is a positive value and Cbs1 is greater than a certain threshold, it is determined that the earphone is worn by the human ear; otherwise, it is determined that the earphone is falsely touched.

It should be understood that, in the embodiment of the present application, the first threshold may be determined according to a capacitance parameter of a capacitive sensor, that is, different capacitance parameters may correspond to different first thresholds. For example, when the dielectric constant of the capacitive sensor is $\varepsilon$, an electrode area is S and a dielectric layer thickness is d, a corresponding first threshold is M; and when the dielectric constant of the capacitive sensor is $2\varepsilon$, the electrode area is 2S and the dielectric layer thickness is d, a corresponding first threshold is 4M, thereby avoiding the use of a uniform first threshold and the cause of the problem of false determination when a capacitance value of a detected coupling capacitance of a detection capacitor is greater.

Optionally, in some embodiments, the detection module may determine multiple sets of first coupling capacitances and second coupling capacitances. The combination of the multiple sets of first coupling capacitances and second coupling capacitances may be obtained based on the wearing of the earphone and the touch of the earphone by the same user multiple times, or may be obtained based on the wearing of the earphone and the touch of the earphone by multiple users multiple times, or may be obtained based on different capacitance parameters or temperature conditions, or the like.

Further, the detection module may determine two scenes according to the multiple sets of first coupling capacitances and second coupling capacitances, that is, in a human ear wearing scene and a false touch scene, a difference curve of difference values between the first coupling capacitances and the second coupling capacitances is plotted, and reasonable ranges corresponding to the difference values between the first coupling capacitances and the second coupling capacitances are further calculated in the two scenes. It is assumed that a difference value between a first coupling capacitance and a second coupling capacitance is usually within a first difference value range in the human ear wearing scene, and the difference value between the first coupling capacitance and the second coupling capacitance is usually within a second difference value range in the false touch scene. Then, in the subsequent earphone wearing detection, the detection module may determine whether it belongs to the human ear wearing scene or the false touch scene according to the first difference value range and the second difference value range.

For example, the detection module may determine that the earphone is worn by the human ear when the difference value between the first coupling capacitance and the second coupling capacitance is within the first difference value range.

For another example, the detection module may determine that the earphone is falsely touched when the difference value between the first coupling capacitance and the second coupling capacitance is within the second difference value range.

In order to improve the accuracy of the earphone wearing detection, in some embodiments, the detection module may also further determine whether the first coupling capacitance is greater than a second threshold when the difference value between the first coupling capacitance and the second coupling capacitance is greater than the first threshold described above (denoted as condition 1) or the difference value between the first coupling capacitance and the second coupling capacitance is within the first difference value range (denoted as condition 2), and determine that the earphone is worn by the human ear accordingly.

Optionally, in some embodiments, the second threshold may be set as a basic capacitance of the first capacitive sensor. When the first coupling capacitance is greater than the basic capacitance of the first capacitive sensor, it may be considered that there is a touch object in contact with the first capacitive sensor. In a case that the foregoing condition 1 or condition 2 is met, whether the first coupling capacitance is greater than the basic capacitance of the first capacitive sensor is further determined, and in a case that the first coupling capacitance is greater than the basic capacitance of the first capacitive sensor, it is then determined that the earphone is worn by the human ear, which is beneficial to improvement of the accuracy of the earphone wearing detection.

Optionally, in some embodiments, the second capacitive sensor may be disposed in an edge area of the earphone, the edge area of the earphone is usually a usual touch area when the human hand touches the earphone, and when the earphone is worn by the human ear, the human ear is not in contact with the area.

In this case, when the earphone is worn by the human ear, a capacitance value of the second capacitive sensor detected by the detection module is a basic capacitance of the second capacitive sensor, that is, the second coupling capacitance is merely the basic capacitance of the second capacitive sensor. In this way, when a difference is made between the first coupling capacitance and the second coupling capacitance, it is beneficial to improvement of semaphore used for earphone wearing detection, thereby improving the accuracy of the earphone wearing detection.

Optionally, in some embodiments, the first capacitive sensor may be disposed in an area where the human ear is in contact with the earphone when the earphone is worn by the human ear. Generally, the human hand is not in contact with the ear when touching the earphone.

In this case, when the earphone is touched by the human hand, a capacitance value of the first capacitive sensor detected by the detection module is a basic capacitance of the first capacitive sensor, that is, the first coupling capacitance is the basic capacitance of the first capacitive sensor. In this way, when a difference is made between the first coupling capacitance and the second coupling capacitance, it is beneficial to improvement of semaphore used for earphone wearing detection, thereby improving the accuracy of the earphone wearing detection.

Optionally, in an embodiment of the present application, the earphone may further include:
  a processing module configured to perform operations associated with the wearing of the earphone by the human ear when it is determined that the earphone is worn by the human ear; or
  to perform operations associated with the false touch of the earphone when it is determined that the earphone is falsely touched.

For example, in a case that the detection module determines that the earphone is worn by the human ear, the processing module of the earphone may control to turn on a functional module inside the earphone, such as a music play function.

For another example, in a case that the detection module determines that the earphone is falsely touched, the processing module of the earphone may further control not to turn on a functional module inside the earphone, thereby reducing the power consumption of the earphone and improving the user experiences.

Therefore, in the embodiment of the present application, the subsequent associated operations may be determined according to a detection result of the earphone wearing detection, that is, whether the earphone is worn by the human ear or falsely touched, which could reduce the probability of false response.

It should be understood that, in the embodiment of the present application, the detection module and the processing module may be different modules, or may be a same module, that is, the function of the processing module may also be performed by the detection module, and the processing module may be omitted in this case.

It should also be understood that, in the embodiment of the present application, the second capacitive sensor and the first capacitive sensor may also adopt different capacitance parameters, such as different dielectric constants or electrode areas. In this way, in subsequent comparison of a capacitance difference, it is only necessary to adjust the first coupling capacitance and the second coupling capacitance to coupling capacitances under a same capacitance parameter according to the capacitance parameters of the second capacitive sensor and the first capacitive sensor, and then compare them.

In other words, in a case that the capacitance parameters of the first capacitive sensor 110 and the second capacitive sensor 120 are the same, the difference value between the first coupling capacitance and the second coupling capacitance may be directly calculated, and whether the earphone is worn by the human ear is further detected according to the difference value; and in a case that the capacitance parameters of the first capacitive sensor 110 and the second capacitive sensor 120 are different, it is only necessary to multiple them by a corresponding weight value to adjust them to coupling capacitances under a same capacitance parameter according to the capacitance parameters of the two. For ease of description, this processing is subsequently omitted, but it does not mean that this processing does not need to be performed.

In the embodiment of the present application, the detection module determines whether the earphone is worn by the human ear according to the difference value between the first coupling capacitance and the second coupling capacitance, and has good performance of resistance to temperature drift.

Specifically, since the first capacitive sensor 110 and the second capacitive sensor 120 are in the same environment, when the temperature changes, the change trends of the first coupling capacitor and the second coupling capacitor are also the same, that is, both either increase or decrease. In this way, whether the earphone is worn by the human ear is determined based on the difference value between the first coupling capacitance and the second coupling capacitance, which could reduce the effect of a change in capacitance value due to temperature and reduce a false determination rate of the earphone wearing detection.

In other alternative embodiments, the following solution may also be adopted to suppress the effect of temperature drift. Specifically, a third capacitive sensor is disposed under an electrode of the first capacitive sensor, and a fourth capacitive sensor is disposed under an electrode of the second capacitive sensor, where capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

Since the capacitance parameters of the third capacitive sensor and the first capacitive sensor are the same, when the temperature changes, variations of coupling capacitances between the two and the touch object are also the same. Similarly, variations of coupling capacitances between the fourth capacitive sensor and the touch object and variations of coupling capacitances between the second capacitive sensor and the touch object are the same. Further, the earphone wearing detection is performed based on a difference value between the coupling capacitance between the third capacitive sensor and the touch object and the coupling capacitance between the first capacitive sensor and the touch object, and a difference value between the coupling capacitance between the fourth capacitive sensor and the touch object and the coupling capacitance between the second capacitive sensor and the touch object, which could effectively suppress temperature drift.

It should be understood that the side under the electrode of the first capacitive sensor and the side under the electrode of the second capacitive sensor may be understood as a side of the earphone far away from the plane of the human ear when the earphone is worn by the human ear. In this case, the first capacitive sensor is closer to the plane of the human ear than the third capacitive sensor, and the second capacitive sensor is closer to the plane of the human ear than the fourth capacitive sensor.

To sum up, in the embodiment of the present application, by disposing a first capacitive sensor and a second capacitive sensor at different positions of an earphone, a difference in capacitance change caused by deformation of different positions may be obtained, so that earphone wearing detection is performed based on the difference in capacitance change, which could improve accuracy of the earphone wearing detection. Further, subsequent associated operations are performed according to a detection result of the earphone wearing detection, which could reduce a false response rate and improve user experiences.

It should be understood that the earphone wearing detection solution of the embodiment of the present application is also applicable to determination of a wearing state of the earphone. Optionally, the wearing state of the earphone includes but is not limited to: the user is ready to wear the earphone, the earphone is successfully worn, the earphone is taken off, or the like. The reason is that the deformation of the earphone caused by different wearing states is different. Accordingly, the difference between the first coupling capacitance and the second coupling capacitance is also different. Based on this, the wearing state of the earphone may also be determined.

Similar to the foregoing embodiments, the detection module may also determine a range of the difference between the first coupling capacitance and the second coupling capacitance in various wearing states, and further determine the wearing state of the earphone according to the range of the difference. For specific implementation, reference is made to the relevant description of the foregoing embodiments, which will not be repeated redundantly herein.

Optionally, in some embodiments, at least one fifth capacitive sensor may be further disposed between the first capacitive sensor and the second capacitive sensor, and the detection module is further configured to:

detect at least one third coupling capacitance between the touch object and the at least one fifth capacitive sensor when the touch object touches the earphone.

Further, the wearing state of the earphone may be determined according to a difference value between coupling capacitances corresponding to two adjacent capacitive sensors among the first coupling capacitance, the at least one third coupling capacitance and the second coupling capacitance.

By disposing a plurality of capacitive sensors at a plurality of positions on the earphone, coupling capacitances at more positions on the earphone may be detected, and the deformation trend of the earphone may be further determined according to a difference between coupling capacitances corresponding to two adjacent capacitive sensors, thereby determining the wearing state of the earphone, for example, during the earphone wearing process, after the earphone is worn, or after the earphone is taken off.

The two adjacent capacitive sensors here may include two proximate capacitive sensors, or no other capacitive sensors are disposed between two capacitive sensors.

For example, if only one fifth capacitive sensor is disposed between the first capacitive sensor and the second capacitive sensor, the first capacitive sensor and the fifth capacitive sensor are adjacent capacitive sensors, and the fifth capacitive sensor and the second capacitive sensor are adjacent capacitive sensors.

For example, the detection module may determine that the wearing state is that the earphone is worn successfully when a difference value between the first coupling capacitance and the third coupling capacitance is greater than a difference value between the third coupling capacitance and the second coupling capacitance.

For another example, the detection module may determine that the wearing state is that the user is ready to wear the earphone when a difference value between the second coupling capacitance and the third coupling capacitance is greater than a difference value between the third coupling capacitance and the first coupling capacitance.

For yet another example, the detection module may determine that the wearing state is that the earphone is taken off when a difference value between the second coupling capacitance and the third coupling capacitance is equal to or approximately equal to a difference value between the third coupling capacitance and the first coupling capacitance.

Optionally, in the embodiment of the present application, the coupling capacitances corresponding to two adjacent capacitive sensors among the first coupling capacitance, the at least one third coupling capacitance and the second coupling capacitance may further be used to determine whether the earphone is in a state contact with water.

When there is water on the earphone, the first capacitive sensor, the second capacitive sensor and the at least one fifth capacitive sensor are usually in a same plane. In this case, the coupling capacitances detected by the detection module are usually relatively close.

In an implementation manner, the detection module may determine that the earphone is in a state contact with water when the difference between coupling capacitances corresponding to two adjacent capacitive sensors is less than, for example, equal to or relatively close to, a certain threshold, otherwise, determine that the earphone is in a state not contact with water.

Optionally, the preparation materials of the first capacitive sensor 110 and the second capacitive sensor 120 may be a printed circuit board (PCB), a flexible printed circuit (FPC) board, metal paper directly attached, or the like.

Optionally, the detection module 130 may specifically be a processor, a processing chip or a detection chip.

It should be understood that the technical solutions of the embodiments of the present application are not limited to the application to the appearance or types of the earphone described in the foregoing embodiments, and should be applicable to all appearance or types of the earphone in which various sensors are applied.

An embodiment of the present application further provides a chip, the chip may be configured to implement the detection module in the earphone according to the foregoing embodiments of the present application and may have functions of the detection module.

Figure 6:
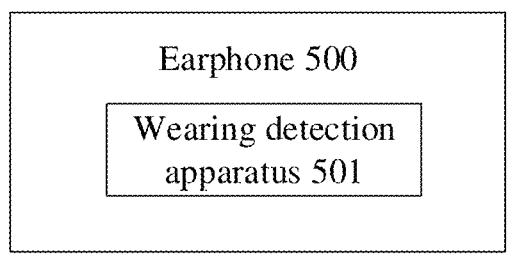
FIG. 6 is a schematic structural diagram of an earphone according to an embodiment of the present application.

An embodiment of the present application further provides an earphone. As shown in FIG. 6, the earphone 500 may include a wearing detection apparatus 501. Optionally, the wearing detection apparatus 501 may be the wearing detection apparatus 10 according to the foregoing various embodiments of the present application. In a specific embodiment, the earphone 500 is a headset.

The wearing detection apparatus, chip and earphone according to the embodiments of the present application are described above with reference to FIG. 1 to FIG. 6. A method for wearing detection according to an embodiment of the present application will be described hereinafter with reference to FIG. 7.

FIG. 7 is a schematic flowchart of a method for wearing detection provided in an embodiment of the present application, which is applied to a wearing detection apparatus including at least one first capacitive sensor and at least one second capacitive sensor, where the first capacitive sensor is disposed on at inner side of the second capacitive sensor, and the method 300 includes:

S301, detecting a first coupling capacitance between a touch object and the first capacitive sensor and a second coupling capacitance between the touch object and the second capacitive sensor when an earphone mounted with the wearing detection apparatus is touched by the touch object; and S302, determining whether the earphone is worn by a human ear according to a difference between the first coupling capacitance and the second coupling capacitance.

It should be understood that the method for wearing detection according to the embodiment of the present application may be implemented by the wearing detection apparatus or the detection module therein according to the foregoing embodiment of the present application, or may also be implemented by an earphone including a wearing detection apparatus. For the relevant specific description therein, reference may be made to the foregoing various embodiments, which will not be repeatedly redundantly hereinafter for brevity.

Optionally, in some embodiments, S302 may specifically include:

determining whether the earphone is worn by the human ear according to a difference value between the first coupling capacitance and the second coupling capacitance.

Optionally, in some embodiments, the determining whether the earphone is worn by the human ear according to the difference value between the first coupling capacitance and the second coupling capacitance, includes:

if the difference value between the first coupling capacitance and the second coupling capacitance is greater than a first threshold, determining that the earphone is worn by the human ear; or If the difference value between the first coupling capacitance and the second coupling capacitance is less than or equal to a first threshold, determining that the earphone is not worn by the human ear.

Optionally, in some embodiments, S302 may specifically include:

determining whether the earphone is worn by the human ear according to the difference value between the first coupling capacitance and the second coupling capacitance as well as the first coupling capacitance.

Optionally, in some embodiments, the determining whether the earphone is worn by the human ear according to the difference value between the first coupling capacitance and the second coupling capacitance as well as the first coupling capacitance, includes:

if the difference value between the first coupling capacitance and the second coupling capacitance is greater than a first threshold and the first coupling capacitance is greater than a second threshold, determining that the earphone is worn by the human ear; or if the difference value between the first coupling capacitance and the second coupling capacitance is less than or equal to a first threshold, determining that the earphone is not worn by the human ear.

Optionally, in some embodiments, capacitance parameters of the first capacitive sensor and the second capacitive sensor are the same.

Optionally, in some embodiments, the method 300 further includes:

if capacitance parameters of the first capacitive sensor and the second capacitive sensor are different, processing the first coupling capacitance and the second coupling capacitance according to the capacitance parameters of the first capacitive sensor and the second capacitive sensor, to obtain an equivalent first coupling capacitance and an equivalent second coupling capacitance under a same capacitance parameter, and determining whether the earphone is worn by the human ear according to a difference between the equivalent first coupling capacitance and the equivalent second coupling capacitance.

Optionally, in some embodiments, at least one fifth capacitive sensor is disposed between the first capacitive sensor and the second capacitive sensor, and the method 300 further includes:

detecting at least one third coupling capacitance between the touch object and the at least one fifth capacitive sensor when the touch object touches the earphone, and determining a wearing state of the earphone according to a difference value between coupling capacitances corresponding to two adjacent capacitive sensors among the first coupling capacitance, the at least one third coupling capacitance and the second coupling capacitance.

Optionally, in some embodiments, when the earphone is worn by the human ear, an electrode plane of the first capacitive sensor is parallel to a plane of the human ear, and an electrode plane of the second capacitive sensor is parallel to the plane of the human ear or perpendicular to the plane of the human ear.

Optionally, in some embodiments, a third capacitive sensor is disposed under an electrode of the first capacitive sensor, and a fourth capacitive sensor is disposed under an electrode of the second capacitive sensor, where capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

Optionally, in some embodiments, the second capacitive sensor is disposed in a touch area when a human hand touches the earphone, and the first capacitive sensor is disposed in an area where the human ear is in contact with the earphone when the earphone is worn by the human ear.

Optionally, in some embodiments, the first capacitive sensor and the second capacitive sensor are in a concentric circular ring shape or a concentric rectangular shape.

For example, a plurality of first capacitive sensors included in the wearing detection apparatus may be arranged into a first circular ring, a plurality of second capacitive sensors included in the wearing detection apparatus may be arranged into a second circular ring, and the plurality of first capacitive sensors constituting the first circular ring are arranged at inner sides of the plurality of second capacitive sensors constituting the second circular ring; or it is possible that a plurality of at least one first capacitive sensors are arranged into a first arc shape, the plurality of second capacitive sensors are arranged into a second arc shape, and the plurality of first capacitive sensors constituting the first arc shape are arranged at inner sides of the plurality of second capacitive sensors constituting the second arc shape.

Optionally, the first arc shape and the second arc shape may be circular arcs, or may also be in other arc shapes such as an elliptic arc shape.

Optionally, in some embodiments, the earphone is a headset.

Optionally, in some embodiments, the wearing detection apparatus further includes a plurality of channels, the first capacitive sensor is connected to a first channel of the plurality of channels, the second capacitive sensor is connected to a second channel of the plurality of channels, and the method further includes:

detecting the first coupling capacitance between the touch object and the first capacitive sensor through the first channel, and detecting the second coupling capacitance between the touch object and the second capacitive sensor through the second channel.

It should be understood that specific examples in the present application are just for helping those skilled in the art better understand the embodiments of the present application, rather than for limiting the scope of the present application.

A person of ordinary skill in the art may realize that, units and algorithm steps of various examples described in connection with the embodiments disclosed herein can be implemented by touch control hardware, computer software, or a combination of both, and in order to clearly describe the interchangeability of hardware and software, in the above description, the composition and steps of the various examples have been generally described according to functions. Whether these functions are performed by hardware or software depends on specific applications and designed constraint conditions of the technical solutions. Those skilled may implement the described functions by using different methods for each specific application, but this implementation should not be considered to be beyond the scope of the present application.

In the several embodiments provided in the present disclosure, it should be understood that the disclosed system, apparatus, and method may be implemented in other manners. For example, the embodiments of the above-described apparatus are only exemplary, for example, the division of the units is only a logic function division, other division modes may be adopted in practice, e.g., multiple units or components may be combined or integrated in another system, or some characteristics may be omitted or be not executed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If being implemented in the form of a software functional unit and sold or used as a separate product, the integrated unit may be stored in a computer-readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The foregoing storage medium includes: various media that may store program codes, such as a U-disk, a removable hard disk, a read-only memory (ROM), a random access memory (RAM), a magnetic disk, a compact disk, and so on.

The foregoing description is only a specific implementation manner of the present application. The protection scope of the present application, however, is not limited thereto. Various equivalent modifications or replacements may be readily conceivable to any skilled one who is familiar with this art within the technical scope disclosed in the present application, and such modifications or replacements shall fall within the protection scope of the present application. Therefore, the protection scope of the present application shall be subject to the protection scope of the claims.

What is claimed is:

1. A wearing detection apparatus, wherein the wearing detection apparatus is mounted on an earphone, and the wearing detection apparatus comprises:
    at least one first capacitive sensor and at least one second capacitive sensor, wherein the first capacitive sensor is disposed at an inner side of the second capacitive sensor; and
    a processor configured to detect a first coupling capacitance between a touch object touching the earphone and the first capacitive sensor and a second coupling capacitance between the touch object and the second capacitive sensor when the earphone is touched, and to determine whether the earphone is worn by a human ear according to a difference value between the first coupling capacitance and the second coupling capacitance;
    wherein the processor is specifically configured to:
    determine that the earphone is worn by the human ear if the difference value between the first coupling capacitance and the second coupling capacitance is greater than a first threshold and the first coupling capacitance is greater than a second threshold; or
    determine that the earphone is not worn by the human ear if the difference value between the first coupling capacitance and the second coupling capacitance is less than or equal to a first threshold.

2. The wearing detection apparatus according to claim 1, wherein the processor is further configured to:
    if capacitance parameters of the first capacitive sensor and the second capacitive sensor are different, process the first coupling capacitance and the second coupling capacitance according to the capacitance parameters of the first capacitive sensor and the second capacitive sensor, to obtain an equivalent first coupling capacitance and an equivalent second coupling capacitance under a same capacitance parameter, and determine whether the earphone is worn by the human ear according to a difference between the equivalent first coupling capacitance and the equivalent second coupling capacitance.

3. The wearing detection apparatus according to claim 1, wherein when the earphone is worn by the human ear, an electrode plane of the first capacitive sensor is parallel to a plane of the human ear, and an electrode plane of the second capacitive sensor is parallel to the plane of the human ear or perpendicular to the plane of the human ear.

4. The wearing detection apparatus according to claim 1, wherein a third capacitive sensor is disposed under an electrode of the first capacitive sensor, and a fourth capacitive sensor is disposed under an electrode of the second capacitive sensor,
    wherein capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

5. The wearing detection apparatus according to claim 1, wherein at least one fifth capacitive sensor is disposed between the first capacitive sensor and the second capacitive sensor, and the processor is further configured to:
    detect at least one third coupling capacitance between the touch object and the at least one fifth capacitive sensor when the touch object touches the earphone, and determine a wearing state of the earphone according to a difference value between coupling capacitances corresponding to two adjacent capacitive sensors among the first coupling capacitance, the at least one third coupling capacitance and the second coupling capacitance.

6. The wearing detection apparatus according to claim 1, wherein the second capacitive sensor is disposed in an edge area of the earphone, and the first capacitive sensor is disposed in an area where the human ear is in contact with the earphone when the earphone is worn by the human ear.

7. The wearing detection apparatus according to claim 1, wherein the first capacitive sensor and the second capacitive sensor are in a concentric circular ring shape or a concentric rectangular shape.

8. A method for wearing detection, wherein the method is applied to a wearing detection apparatus comprising at least one first capacitive sensor and at least one second capacitive sensor, wherein the first capacitive sensor is disposed at an inner side of the second capacitive sensor, and the method comprises:
    detecting a first coupling capacitance between a touch object and the first capacitive sensor and a second coupling capacitance between the touch object and the second capacitive sensor when an earphone mounted with the wearing detection apparatus is touched by the touch object; and
determining whether the earphone is worn by the human ear according to a difference value between the first coupling capacitance and the second coupling capacitance wherein the determining whether the earphone is worn by the human ear according to a difference value between the first coupling capacitance and the second coupling capacitance, comprises:
    determining that the earphone is worn by the human ear if the difference value between the first coupling capacitance and the second coupling capacitance is greater than a first threshold and the first coupling capacitance is greater than a second threshold; or determining that the earphone is not worn by the human ear if the difference value between the first coupling capacitance and the second coupling capacitance is less than or equal to a first threshold.

9. The method according to claim 8, wherein the method further comprises:

if capacitance parameters of the first capacitive sensor and the second capacitive sensor are different, processing the first coupling capacitance and the second coupling capacitance according to the capacitance parameters of the first capacitive sensor and the second capacitive sensor, to obtain an equivalent first coupling capacitance and an equivalent second coupling capacitance under a same capacitance parameter, and determining whether the earphone is worn by the human ear according to a difference between the equivalent first coupling capacitance and the equivalent second coupling capacitance.

10. The method according to claim 8, wherein at least one fifth capacitive sensor is disposed between the first capacitive sensor and the second capacitive sensor, and the method further comprises:

detecting at least one third coupling capacitance between the touch object and the at least one fifth capacitive sensor when the touch object touches the earphone, and determining a wearing state of the earphone according to a difference value between coupling capacitances corresponding to two adjacent capacitive sensors among the first coupling capacitance, the at least one third coupling capacitance and the second coupling capacitance.

11. The method according to claim 8, wherein a third capacitive sensor is disposed under an electrode of the first capacitive sensor, and a fourth capacitive sensor is disposed under an electrode of the second capacitive sensor, wherein capacitance parameters of the third capacitive sensor and the first capacitive sensor are the same, capacitance parameters of the fourth capacitive sensor and the second capacitive sensor are the same, and a side under the electrode of the first capacitive sensor and a side under the electrode of the second capacitive sensor are a side far away from the human ear when the earphone is worn by the human ear.

12. The method according to claim 8, wherein the second capacitive sensor is disposed in an edge area of the earphone, and the first capacitive sensor is disposed in an area where the human ear is in contact with the earphone when the earphone is worn by the human ear.

13. The method according to claim 8, wherein the first capacitive sensor and the second capacitive sensor are in a concentric circular ring shape or a concentric rectangular shape.

14. An earphone, comprising:

the wearing detection apparatus which comprises:

at least one first capacitive sensor and at least one second capacitive sensor, wherein the first capacitive sensor is disposed on an inner side of the second capacitive sensor; and a processor configured to detect a first coupling capacitance between a touch member touching the earphone and the first capacitive sensor and a second coupling capacitance between the touch member and the second capacitive sensor when the earphone is touched, and to determine whether the earphone is worn by a human ear according to a difference value between the first coupling capacitance and the second coupling capacitance;

wherein the processor is specifically configured to:

determine that the earphone is worn by the human ear if the difference value between the first coupling capacitance and the second coupling capacitance is greater than a first threshold and the first coupling capacitance is greater than a second threshold; or determine that the earphone is not worn by the human ear if the difference value between the first coupling capacitance and the second coupling capacitance is less than or equal to a first threshold.

\* \* \* \* \*